(No Model.) 2 Sheets—Sheet 1.
M. MACLEOD.
CULTIVATOR.
No. 501,285. Patented July 11, 1893.
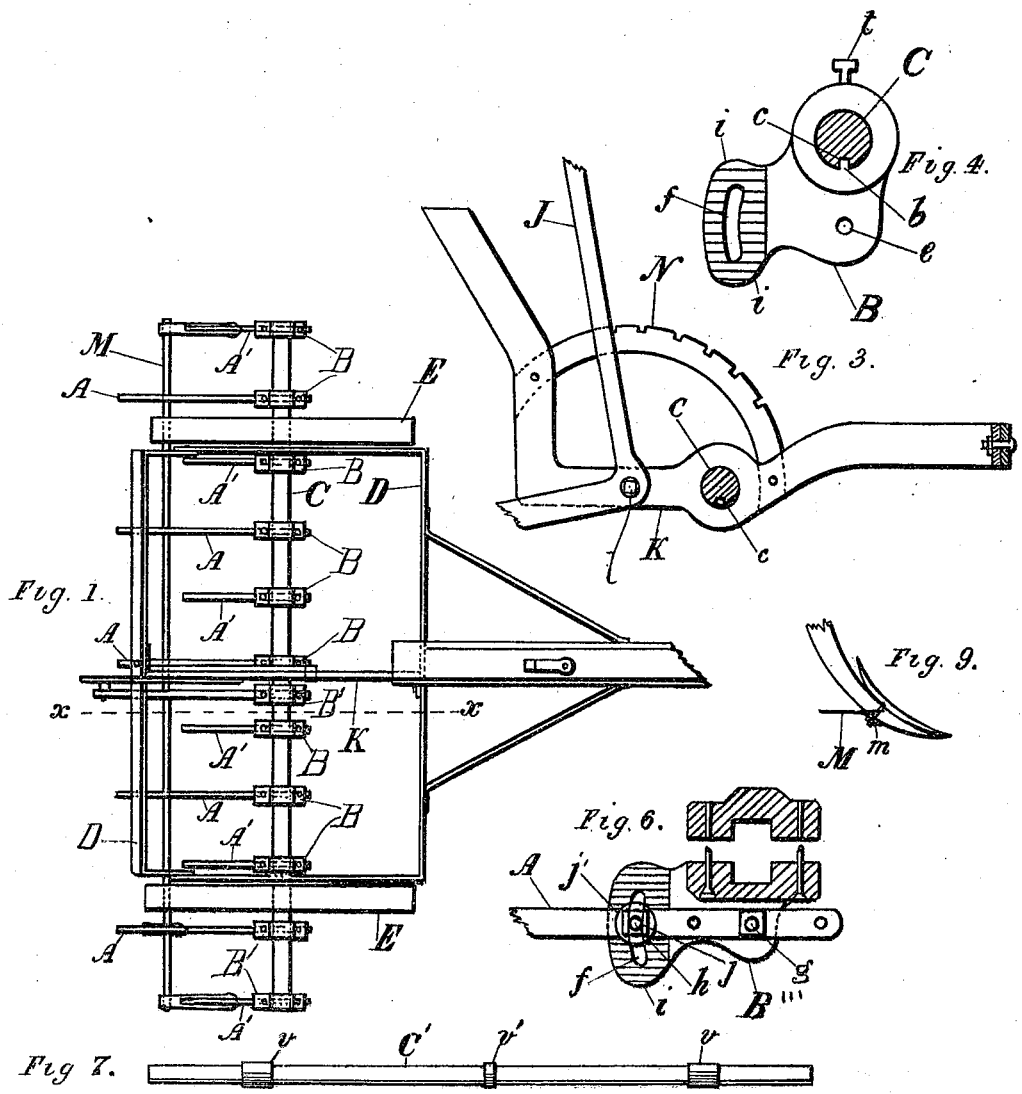
WITNESSES.
James R. Townsend
F. M. Townsend
INVENTOR.
Malcolm Macleod (No Model.) 2 Sheets—Sheet 2.
M. MACLEOD.
CULTIVATOR.
No. 501,285. Patented July 11, 1893.
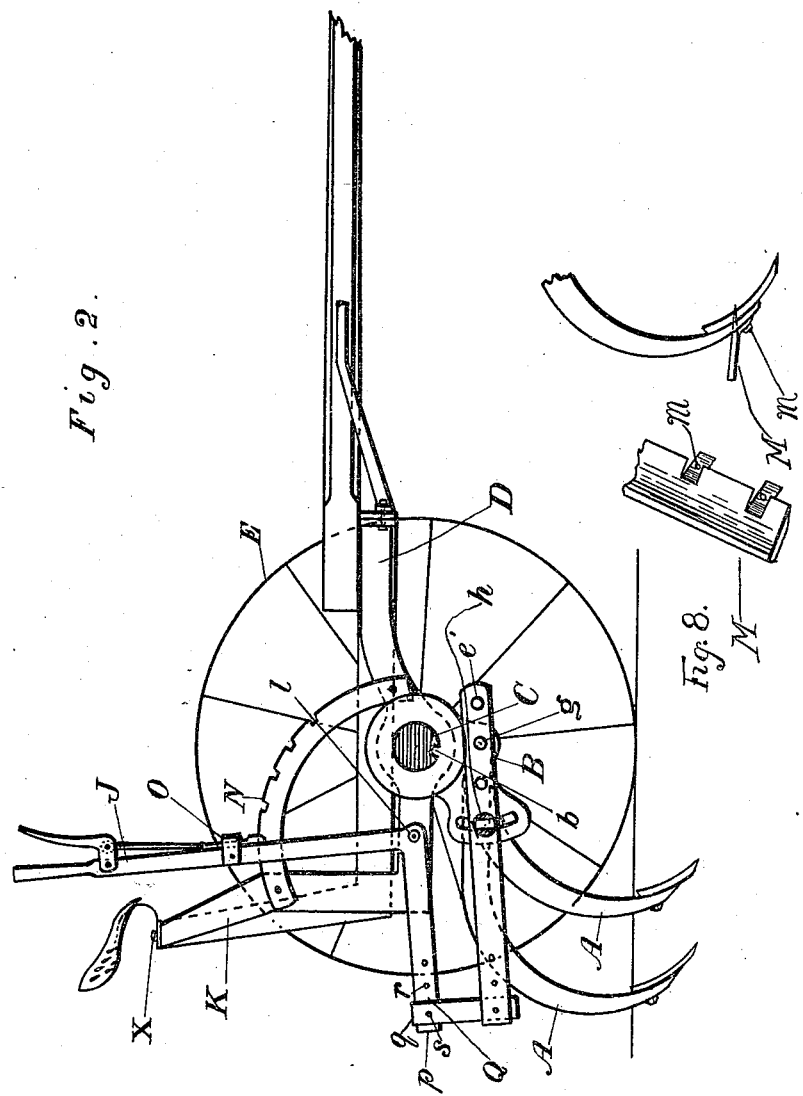
WITNESSES.
INVENTOR.
Malcolm Macleod

UNITED STATES PATENT OFFICE.

MALCOLM MACLEOD, OF LOS ANGELES, CALIFORNIA.

CULTIVATOR.

SPECIFICATION forming part of Letters Patent No. 501,285, dated July 11, 1893.

Application filed July 5, 1892. Serial No. 439,027. (No model.)

*To all whom it may concern:*

Be it known that I, MALCOLM MACLEOD, a subject of the Queen of Great Britain, residing at Los Angeles, in the county of Los Angeles and State of California, have invented a new and useful Orchard, Field, and Vineyard Cultivator, of which the following is a specification.

One object of my invention is to provide a cultivator which is conveniently and readily adaptable for use in cultivating orchards or vineyards or for use in general field work.

Another object of my invention is to enable the operator to readily set the shovels so that all the shovels will cut to an equal depth whether cultivating either shallow or deep.

A further object of my invention is to provide an orchard, field and vineyard cultivator which in its orchard form is adapted to cultivate all the ground and cut out every weed and leave the ground level at one operation without requiring a change of shanks to carry the weed cutters.

A further object of my invention is to increase the ease of raising and lowering the shovels which operate in a direct curve thus allowing all rubbish to fall from the shovels.

My invention comprises the combination in a cultivator of a supporting beam or axle; a shank carrier arranged upon such beam and having a shank arm provided with a pivot hole and a slot arranged to allow adjustment of the cultivator shank.

My invention also comprises various other features and combinations of parts hereinafter fully set forth.

The accompanying drawings illustrate my invention.

Figure 1 is a plan view of my improved cultivator in its orchard form with the weeder and leveler attached. A portion of the tongue is broken away to contract the view, and the seat is removed. Fig. 2 is a cross-section on line $x$—$x$ Fig. 1. Fig. 3 is a view of a fragment of the machine showing a portion of the operating lever and the bracket to which it is pivoted. Fig. 4 shows one form of the axle shank carriers attached to the axle which is shown in cross section. Fig. 5 shows a modified form. Fig. 6 shows a form of such shank carrier adapted for attachment to an angular axle. Fig. 7 indicates such axle. Fig. 8 is a fragment of the weed cutter and leveler. Fig. 9 is a side elevation of a fragment of a shank with the shovel and weed cutter attached.

The shovel shanks A A' are secured by means of the carriers B to the axle C which is journaled to the frame D and is supported by the ground or supporting wheels E E which are journaled upon the shaft or axle C (C'). The shaft C as shown is provided with a longitudinal channel $c$. The shank carriers B are fitted upon the axle C and are provided with the spline $b$ arranged to slide in the channel $c$ in the axle. The shank carrier B extends downward and backward from the axle and is provided with a pivot hole $e$ arranged beneath the axle, and an adjusting slot $f$ arranged rearward from the axle. The shanks are respectively pivoted to the carriers by means of pivot bolts $g$ passed through the shanks and through the pivot holes $e$ and are adjustably clamped to the carrier by a suitable clamp such as the clamp bolt $h$ passed through the slot $f$ in the carrier and secured by nut $j$. The face of the arm of the carrier is provided with corrugations $i$ to assist in holding the shank firmly in place when the nut is tightened, and a corrugated washer $j'$ is arranged to engage the corrugations on the carrier to prevent the shank from slipping. The shanks are operated by rotating the shaft or axle and for this purpose the operating lever J is pivoted to the bracket K which is journaled upon the axle and is secured to the frame in front of the axle. The bracket K extends rearward from the axle and is provided with a hole to receive the pivot stud $l$ by which the operating lever J is pivoted to such bracket.

N is the rack with which the pawl O of the operating lever J engages. The rack N is fastened to the bracket K and the rear arm $p$ of the operating lever J is connected with the axle actuating lever Q which is adjustably attached to the axle through the medium of one of the carriers B'.

$q$ is a link coupling the arm $p$ and the lever Q. Its position upon the lever and arm may be changed thus increasing or diminishing the leverage; that is to say, the operating lever J is pivoted to the bracket K rearward from the axle, and the arm $p$ of the lever J is shorter than the lever Q which is secured to the axle and which is connected with the arm $p$ by the link Q which is pivoted to the lever by means of the pivot bolt $s$ passed through suitable holes $r$ in the arm and lever. When the link is placed to the extreme end of the arm and lever as shown in Fig. 2 the difference between the length of such arm and lever is proportionally reduced and when the link is placed closer to the axle the proportional difference is increased and the leverage is also increased.

M indicates the leveler and weed cutter attached to the rear shanks and arranged to extend across the entire path of the machine. It consists of a thin narrow blade provided upon its front edge with downwardly bent ears $m$ having bolt holes therethrough adapted to receive the bolts which secure the shovels to the shanks, and the blade is arranged to lie horizontal when the shovels are inserted into the earth. By attaching the blade to the shanks by its front edge I am enabled to use a light thin blade which is most effectual and gives very little resistance without so much danger of bending the blade as there would be if the blade were secured to the standards by its rear edge and projected forward.

The depth to which the cultivator teeth will be inserted can be accurately adjusted by loosening the nuts $j$ of the bolts which clamp the shanks to their respective carriers, adjusting the shanks to the proper position, and then screwing the nuts tight again. By this means the several shanks can be accurately adjusted with relation to each other so that the ground will be cultivated by them to a uniform depth when the shovels are inserted into the earth.

In cultivating orchards, it is sometimes desirable that the shovels which cultivate beneath the trees, in order to avoid tearing the roots of the tree, should not enter the ground as deeply as those farther from the tree; by means of the adjusting slot the shovels may be quickly adjusted so that some will cultivate deep and some will cultivate shallow as the operator may desire. When rough and dirty ground is cultivated, the front and rear gangs of shovels should be placed farther apart than when cultivating in light clean soil, or the cultivator will clog so frequently as to prove a detriment. In order to provide suitable means for such adjustment, the shanks of the rear series of shovels extend forward from the shank carriers when adjusted for light clean ground, and are provided with an additional hole $e'$ through which the pivot bolt may be passed while the clamp bolt is passed through the pivot hole $e$. This throws the rear shovels still farther to the rear, and so increases the space between the front and rear series of shovels. The slot allows necessary adjustment of the shank.

The carriers shown in Figs. 5 and 6 are made in two pieces and are adapted to be clamped upon the axle. The carrier shown in Fig. 6 is designed to be clamped upon an angular axle such as that shown in Fig. 7. In such Fig. 7 $v$ indicates journals to allow rotation of the axle with relation to the frame of the machine.

In practice the distance between the cultivator shanks can be changed to suit the operator by loosening the set screws $t$ when the form shown in Fig. 4 is used and slipping the shank carriers along the axle to the point desired, when the set screws can again be tightened and the shank carriers secured upon the axle. When extra shovels are desired, the form of carrier (B″, B‴) shown in Figs. 6 and 7 may be clamped upon the axle, thus avoiding the necessity of removal of the wheels to allow their attachment.

The cultivator is light of draft and easy to manipulate, but the seat can be adjusted so that the operator can balance the machine and the shovels can be quickly adjusted by slipping the shanks laterally as above detailed to straddle a row of plants and cultivate both sides, or to cultivate the entire width of the cultivator as may be desirable.

In ordinary soils the round axle is preferable to the square axle as it allows the wheels to be readily adjusted to any distance apart, but where the soil is heavy and obstinate, it is best to use the square axle as the strain upon the shanks might strip the spline from the carriers.

In practice I find that there is very little weight upon the wheels when the cultivator is in operation, because the shovels being almost directly under the axle the weight is principally supported by the shovels, and the wheels simply act as gages to regulate the depth to which they will cultivate. When rubbish accumulates and it is desired to dump the load, the shanks and shovels are supported by the wheels, and move around the axle, which is the pivotal point, and the shovels thus practically move backward from the load when the load is being discharged, thus greatly facilitating the operation of clearing the cultivator. The rear of the frame D is bent upward to permit the shanks to rise high enough to dump the rubbish without the shanks striking against the frame.

Now, having described my invention, what I claim as new, and desire to secure by Letters Patent, is—

1. In a cultivator the combination set forth of the supporting shaft or axle; the shank carrier arranged upon such shaft and having a shank arm provided with a pivot hole and a slot; the pivot and the clamp bolt and nut arranged to clasp the shank to the carrier and to allow adjustment of the cultivator shank.

2. In a cultivator, the combination set forth of the axle; the supporting wheels journaled upon such axle; the shank carrier arranged for attachment upon such axle, and provided with the rearwardly extending arm having a pivot hole and an adjusting slot therein; the cultivator shank provided at its lower end with the shovel and at its upper end with bolt holes corresponding to the slot and pivot hole in the shank carrier, the clamp and pivot bolt passed through the shank and the shank carrier, and the nuts arranged on such bolts.

3. In a cultivator the combination of the frame; the axle journaled to such frame; the supporting wheels journaled upon such axle; the cultivator shanks provided with cultivator shovels and fixed to such axle; the axle actuating lever adjustably attached to the axle and extending rearwardly therefrom; the seat bracket preferably journaled upon the axle and attached to the frame; the rack fixed to the seat bracket; the operating lever provided with the rearwardly extending arm and the pawl arranged to engage the rack and pivoted to the seat bracket; and the link arranged to couple the rear arm of the operating lever and the axle actuating lever to each other.

4. In a cultivator the weed cutter set forth comprising a thin narrow metal blade arranged to extend the full width of the cultivator and provided upon its front edge with downwardly bent ears having bolt holes therethrough adapted to receive the bolts which also secure the shovels to the shanks, all so arranged and proportioned that when the blade is secured to the shanks and the cultivator is in operation the plane of the blade will be substantially horizontal, permitting cultivation, weeding and leveling at the same operation.

5. In a cultivator the combination set forth of the frame; the axle journaled to the frame; the supporting wheels journaled upon the axle; the shank carriers arranged upon the axle and provided with the pivot hole and the slot; the cultivator shanks having their upper ends secured to the shank carriers by bolts passing through the pivot hole and slot; the bolts; the cultivator shovels fixed to the lower ends of the shanks; the weed cutter comprising the metal blade of sufficient length to extend the full width of the cultivator and provided upon its front edge with downwardly bent ears having bolt holes therethrough adapted to receive the bolts which secure the shovels to the shanks; the bolts; the bracket journaled on the axle and attached to the frame; the rack fixed to the bracket; the operating lever pivoted to the bracket and provided with the rearwardly extending arm and the pawl arranged to engage the rack; the axle actuating lever fixed to the axle and extending toward the rear, and the link arranged to connect the rear arm of the operating lever with the actuating lever.

6. In a cultivator the combination set forth of the frame; the cylindrical axle journaled to the frame and provided with the longitudinal channel; the wheels journaled upon the axle; the shank carriers fitted upon the axle and provided with the spline arranged to fit in such channel, and with a pivot hole arranged beneath the axle and a slot arranged rearward from such axle; the cultivator shank secured to the shank carriers by bolts passing through the shank and through the pivot holes and slots; such bolts; the cultivator shovels secured to the shanks; the weed cutter comprising the blade of sufficient length to extend the full width of the cultivator and arranged for attachment to the cultivator shanks, and suitable means for partially rotating the axle to force the shovels into or withdraw them from the ground, substantially as and for the purpose set forth.

MALCOLM MACLEOD.

Witnesses:
JAMES R. TOWNSEND,
ALFRED I. TOWNSEND.